United States Patent
Zeng et al.

(10) Patent No.: US 10,728,360 B2
(45) Date of Patent: Jul. 28, 2020

(54) GENERATING A USER-SPECIFIC PROFILE FEED ASSOCIATED WITH A VISITATION STATE FOR PRESENTATION TO A USER OF A SOCIAL NETWORKING SYSTEM

(71) Applicant: Facebook, Inc., Menlo Park, CA (US)

(72) Inventors: Sharon Zeng, Mountain View, CA (US); Leo Litterello Mancini, Middle Village, NY (US); Dolapo Omobola Falola, London (GB); Michael Slater, Nottingham (GB)

(73) Assignee: Facebook, Inc., Manlo Park, CA (US)

( * ) Notice: Subject to any disclaimer, the term of this patent is extended or adjusted under 35 U.S.C. 154(b) by 149 days.

(21) Appl. No.: 15/447,020

(22) Filed: Mar. 1, 2017

(65) Prior Publication Data

US 2018/0253193 A1  Sep. 6, 2018

(51) Int. Cl.
  *G06F 3/048* (2013.01)
  *H04L 29/08* (2006.01)
  *G06Q 50/00* (2012.01)
  *G06Q 10/10* (2012.01)
  *G06Q 30/02* (2012.01)

(52) U.S. Cl.
  CPC .......... *H04L 67/306* (2013.01); *G06Q 10/10* (2013.01); *G06Q 30/0241* (2013.01); *G06Q 30/0269* (2013.01); *G06Q 50/01* (2013.01)

(58) Field of Classification Search
  CPC ........ G06Q 50/01; H04L 67/306; H04L 67/22
  USPC ........................................ 715/738
  See application file for complete search history.

(56) References Cited

U.S. PATENT DOCUMENTS

| | | | |
|---|---|---|---|
| 2005/0050094 A1* | 3/2005 | Cordery | G06F 17/30867 |
| 2008/0189122 A1* | 8/2008 | Coletrane | G06Q 10/107 |
| | | | 705/319 |
| 2012/0204272 A1* | 8/2012 | Svensson | H04L 67/02 |
| | | | 726/29 |
| 2014/0040368 A1* | 2/2014 | Janssens | H04L 67/306 |
| | | | 709/204 |
| 2018/0352071 A1* | 12/2018 | Karunamuni et al. | |
| | | | G06Q 10/107 |
| 2019/0147374 A1* | 5/2019 | Grignon | G06Q 50/01 |

* cited by examiner

*Primary Examiner* — Alex Olshannikov
(74) *Attorney, Agent, or Firm* — Fenwick & West LLP

(57) ABSTRACT

A social networking system provides a user with a newsfeed that includes content selected by the social networking system for presentation to the user and allows the user to request a user-specific profile feed associated with an additional user connected to the user on the social networking system. The user-specific profile feed includes content received from the additional user and designated by the additional user as eligible for presentation in a user-specific profile feed associated with the additional user. If the user requests to view the user-specific profile feed, the social networking system generates and presents the user with the user-specific profile feed including the designated content and information identifying the additional user from whom the content was received. The social networking system stores a visitation state identifying the user presented with the user-specific profile feed and provides information describing the visitation state to the additional user.

25 Claims, 4 Drawing Sheets

GENERATING A USER-SPECIFIC PROFILE FEED ASSOCIATED WITH A VISITATION STATE FOR PRESENTATION TO A USER OF A SOCIAL NETWORKING SYSTEM

BACKGROUND

This disclosure relates generally to social networking systems, and more specifically to generating a user-specific profile feed presented to users of a social networking system.

Social networking systems allow their users to connect, communicate, and share content with other users of a social networking system. The users may be individuals or entities, such as corporations or charities. Users may create user accounts or profiles on a social networking system that are tied to their identities and that include information about the users, such as interests and demographic information. Social networking systems commonly publish various content items provided by their users for presentation to other users in feeds of content associated with user accounts on the social networking systems. For example, social networking systems commonly provide their users with newsfeeds that present content items provided by additional users to which the users are connected on the social networking systems; the content items may be presented in a particular order, such as a chronological order or an order based on a predicted affinity of the users for the content items. Content items provided to a social networking system by a user may include declarative information, status updates, check-ins to locations, images, photographs, videos, text data, or any other information the user wishes to share with additional users connected to the user on the social networking system.

Users who are connected to additional users on social networking systems may have different types of relationships with the additional users that mirror their real-life relationships. For example, a user who is connected to an additional user on a social networking system may be a family member, a friend, a co-worker, or an acquaintance of the additional user. Relationships between users who are connected to each other on a social networking system may also vary in degrees of closeness between the users. For example, friends who are connected to each other on a social networking system may share a relationship having a high degree of closeness (e.g., close friends having a strong personal relationship) or a low degree of closeness (e.g., acquaintances having a distant relationship). Hence, social networking system users may establish connections on a social networking system reflecting different types of relationships or degrees of closeness with additional social networking system users.

Users of a social networking system are more likely to be interested in viewing content presented by the social networking system if the content is associated with additional users who share a particular type of relationship or degree of closeness with the users. For example, users are generally more interested in viewing content items shared on a social networking system by family members and close personal friends than by acquaintances. However, social networking systems conventionally present users with feeds of content including content items received from various additional users connected to the users on the social networking system, regardless of a type of relationship or degree of closeness between the users and additional users. For example, a social networking system presents a user with a newsfeed including more content items received from an acquaintance of the user than from a close friend of the user if the acquaintance shares more content on the social networking system than the friend. If users are presented with content regardless of a type of relationship or degree of closeness between the user and additional users sharing the content, the users may be less interested in the content and become dissatisfied with a social networking system, leading to a decline in user engagement with the social networking system.

SUMMARY

A social networking system provides a viewing user with a feed of content selected by the social networking system for presentation to the viewing user and allows the viewing user to receive a user-specific profile feed associated with a posting user connected to the viewing user on the social networking system. For example, the social networking system selects content items generated by the social networking system based on a predicted affinity of the viewing user for each of the selected content items and presents the content items to the viewing user in a newsfeed associated with an account on the social networking system associated with the viewing user. In the preceding example, the newsfeed includes various interactive elements allowing the viewing user to request presentation of a user-specific profile feed associated with a posting user connected to the viewing user on the social networking system by interacting with the interactive elements. A user-specific profile feed is a feed of content including content items not presented in the newsfeed that are received by the social networking system from a posting user and that are associated with information designating the content items as eligible for presentation by the social networking system in a user-specific profile feed associated with the posting user. For example, a user-specific profile feed includes posts, status updates, images, videos, audio and any other content provided to the social networking system by a posting user that were designated by the posting user as eligible for presentation in a user-specific profile feed associated with the posting user.

In various embodiments, the social networking system generates content items and receives content items from different posting users of the social networking system, and stores and maintains the content items for later retrieval. At various times, the social networking system selects content items for presentation to a viewing user based on a determined affinity of the viewing user for the content items. For example, when a viewing user logs in to the social networking system or otherwise requests content from the social networking system, the social networking system retrieves the content items and determines an affinity of the viewing user for each of the content items based on attributes associated with the viewing user's account on the social networking system matching attributes of the content items. In this example, the social networking system selects a plurality of the retrieved content items for which the viewing user has at least a threshold affinity (e.g., based on a computed affinity score associated with each content item). The selected content items are presented to the viewing user in a feed of content, such as a newsfeed, generated by the social networking system and associated with the viewing user's account on the social networking system. For example, the social networking system generates a feed of content including the selected content items and provides the feed of content to a client device associated with the viewing user for presentation to the viewing user via the client device.

In addition to the selected content items, the feed of content provided to the viewing user includes information identifying one or more posting users connected to the viewing user on the social networking system and a graphical user interface for receiving interactions of the viewing user with the feed of content. Information identifying a posting user may include a name of the posting user, an image associated with the posting user's account on the social networking system, or any other suitable information for identifying the posting user to the viewing user. The graphical user interface includes various interactive elements allowing the viewing user to navigate through the feed of content to view the presented content items and to request a user-specific profile feed associated with a posting user connected to the viewing user on the social networking system identified in the feed of content. For example, a viewing user requests a user-specific profile feed associated with a posting user by selecting an image associated with the posting user's account on the social networking system presented in a display area of a graphical user interface included in the feed of content.

If the viewing user requests to view a user-specific profile feed associated with a posting user identified in the provided feed of content, the social networking system retrieves a set of content items received from the posting user which were designated by the posting user as eligible for presentation in a user-specific profile feed associated with the posting user. For example, the social networking system retrieves information maintained in association with a posting user's account on the social networking system in response to receiving an interaction of the viewing user with an image associated with the posting user's account included in a newsfeed provided to the viewing user. In the preceding example, the social networking system identifies the posting user based on the retrieved information and retrieves a set of content items received from the posting user designated by the posting user as eligible for presentation by the social networking system in a user-specific profile feed associated with the posting user. Hence, the social networking system retrieves content items received from a posting user which were designated by the posting user as eligible for presentation by the social networking system in a user-specific profile feed associated with the posting user in response to receiving a request from a viewing user for a user-specific profile feed associated with the posting user.

The social networking system generates a user-specific profile feed including one or more of the retrieved set of content items and information identifying the posting user from which the content items were received for presentation to the viewing user. Information identifying the posting user may include a name of the posting user, an image associated with the posting user's account on the social networking system, or any other suitable information for identifying the posting user to the viewing user. For example, the social networking system generates a user-specific profile feed including a display area that displays one or more content items from the retrieved set of content items along with a name of the posting user from whom the one or more content items were received. The social networking system provides the viewing user with the generated user-specific profile feed presenting the one or more content items from the set of content items and the information identifying the posting user. For example, the social networking system communicates the user-specific profile feed to a client device associated with the viewing user for presentation to the viewing user via a display area of the client device.

In various embodiments, the user-specific profile feed includes a graphical user interface having various navigational elements allowing the viewing user to navigate through the user-specific profile feed to display content items included in the user-specific profile feed. For example, the viewing user navigates through the user-specific profile feed by performing a swiping gesture in a display area of a client device presenting the user-specific profile feed to cycle content items included in the user-specific profile feed into the display area for presentation. In various embodiments, the user-specific profile feed also allows the viewing user to perform an action associated with a presented content item and to submit content items to the social networking system for presentation by the social networking system. For example, the viewing user interacts with various interactive elements of the user-specific profile feed to indicate a preference for a content item included in the user-specific profile feed or to upload a content item associated with the viewing user for presentation by the social networking system.

In some embodiments, the user-specific profile feed allows the viewing user to request additional user-specific profile feeds including content items received from additional posting users connected to the viewing user on the social networking system. If the user-specific profile feed allows the viewing user to request additional user-specific profile feeds including content received from additional posting users, information identifying the additional posting users may be presented in conjunction with the user-specific profile feed. For example, social networking system profile images and user names identifying various additional posting users connected to the viewing user on the social networking system may be presented along a side of a display area included in the user-specific profile feed. In some embodiments, information identifying each additional posting user is presented in the user-specific profile feed in an order based on a predicted affinity of the viewing user for each of the additional posting users. For example, information identifying a plurality of additional posting users is presented to the viewing user in a multi-column list included a display area of the user-specific profile feed; each column of the list identifies an additional posting user. In this example, information identifying an additional posting user for whom the viewing user has a higher affinity is presented in a column of the list that is more prominent in the display area of the user-specific profile feed than information identifying an additional posting user for whom the viewing user has a lower affinity.

In various embodiments, the social networking system predicts an affinity of the viewing user for a posting user based on an amount of interactions between the viewing user and the posting user on the social networking system. In some embodiments, the social networking system determines an affinity score describing an affinity of the viewing user for each posting user of a group of posting users based on a number of interactions between the viewing user and each posting user of the group during a specified time interval. For example, the social networking system ranks posting users based on an affinity score determined for each posting user and presents the viewing user with information identifying each posting user in the user-specific profile feed in an order based on the rank of each posting user. In some embodiments, the social networking system positively or negatively biases a determined affinity score for a posting user based on an amount of time that has elapsed between an occurrence of at least a threshold amount of interactions between the viewing user and the posting user and a time the affinity score is determined.

If the viewing user requests an additional user-specific profile feed associated with an additional posting user (e.g., by interacting with information identifying the additional posting user presented in the user-specific profile feed), the social networking system retrieves a set of content items received from the additional posting user designated by the additional posting user as eligible for presentation in a user-specific profile feed. The social networking system generates an additional user-specific profile feed including one or more content items from the retrieved set of content items and information identifying the additional posting user and provides the additional user-specific profile feed to the viewing user. The additional user-specific profile feed may include a graphical user interface having navigational elements allowing the viewing user to navigate through the additional user-specific profile feed to display the presented content items and to perform actions associated with the content items, as described above. In some embodiments, the additional user-specific profile feed may also allow the viewing user to request yet additional user-specific profile feeds associated with additional posting users identified in the additional user-specific profile feed as previously described.

For each presentation of a user-specific profile feed to a viewing user, the social networking system determines a visitation state describing presentation of the user-specific profile feed to the viewing user. In various embodiments, a visitation state describing presentation of a user-specific profile feed to a viewing user includes information describing an identity of the viewing user presented with the user-specific profile feed. For example, the visitation state includes a social networking system user identifier associated with the viewing user. In some embodiments, the visitation state may also include information describing a number of times a viewing user was presented with a user-specific profile feed, a time when the viewing user was presented with the user-specific profile feed, and interactions with the user-specific profile feed performed by the viewing user. In various embodiments, the visitation state is stored in association with the user-specific profile feed, a content item included in the user-specific profile feed, or an account on the social networking system associated with the viewing user and/or posting user associated with the user-specific profile feed.

In various embodiments, the social networking system provides a posting user associated with a user-specific profile feed with information describing a visitation state of the user-specific profile feed. For example, the social networking system presents a posting user associated with a user-specific profile feed with information identifying each viewing user presented with the user-specific profile feed when the posting user logs in to the social networking system. In the preceding example, the posting user may also be presented with information describing a type and number of actions associated with the user-specific profile feed performed by the viewing users in response to being presented with the user-specific profile feed. Hence, the social networking system generates and presents a viewing user with a user-specific profile feed associated with a particular posting user in response to receiving a request from the viewing user for the user-specific profile feed and provides the posting user with information describing presentation of the user-specific profile feed to the viewing user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
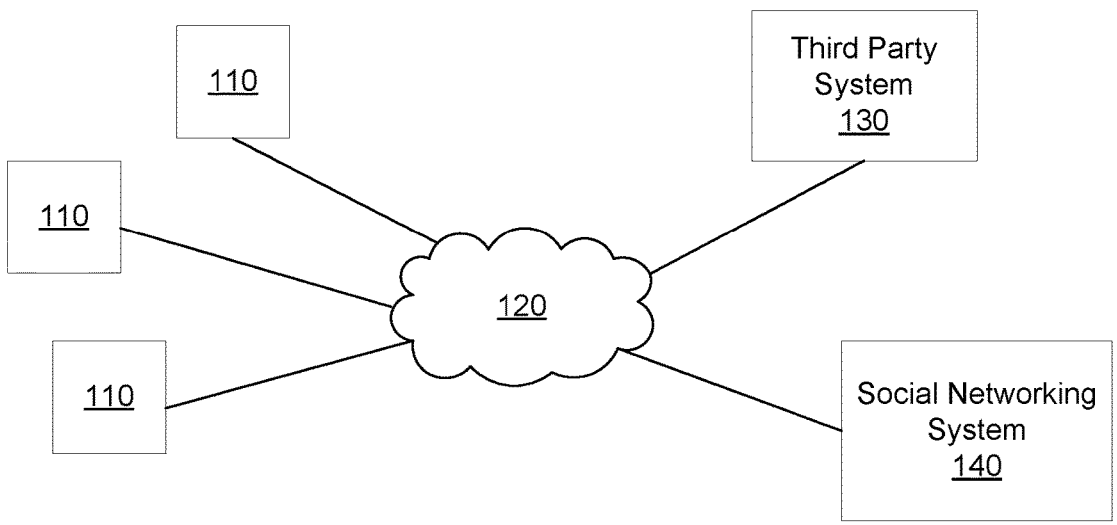
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to social networking systems that are content sharing networks or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the social networking system 140, such as advertisements, content, or information about an application provided by the third party system 130.

In some embodiments, one or more of the third party systems 130 provide content to the social networking system 140 for presentation to users of the social networking system 140 and provide compensation to the social networking system 140 in exchange for presenting the content. For example, a third party system 130 provides advertisement requests, which are further described below in conjunction with FIG. 2, including advertisements for presentation and amounts of compensation provided by the third party system 130 for presenting the advertisements to the social networking system 140. Other types of sponsored content may be provided by a third party system 130 to the social networking system 140 for presentation by the social networking system 140 in exchange for compensation from the third party system 130. Sponsored content from a third party system 130 may be associated with the third party system 130 or with an entity on whose behalf the third party system 130 operates.

In some embodiments, one or more of the third party systems 130 is a trusted third party system 130 that provides data analysis services to the social networking system 140. For example, a third party system 130 is an entity, such as a data analytics provider, that receives information describing actions performed by users of the social networking system 140 from the social networking system 140 or one or more entities external to the social networking system 140. In various embodiments, the third party system 130 receives information describing actions associated with electronic content presented to various audiences by various content publishers and identifies individuals who performed the actions. In some embodiments, the third party system 130 compiles information describing the actions and the individuals who performed them, and provides the information to the social networking system 140 as a performance metric or as raw data, which the social networking system 140 utilizes for generation of a performance metric, as described in more detail in conjunction with FIG. 3 below.

Figure 2:
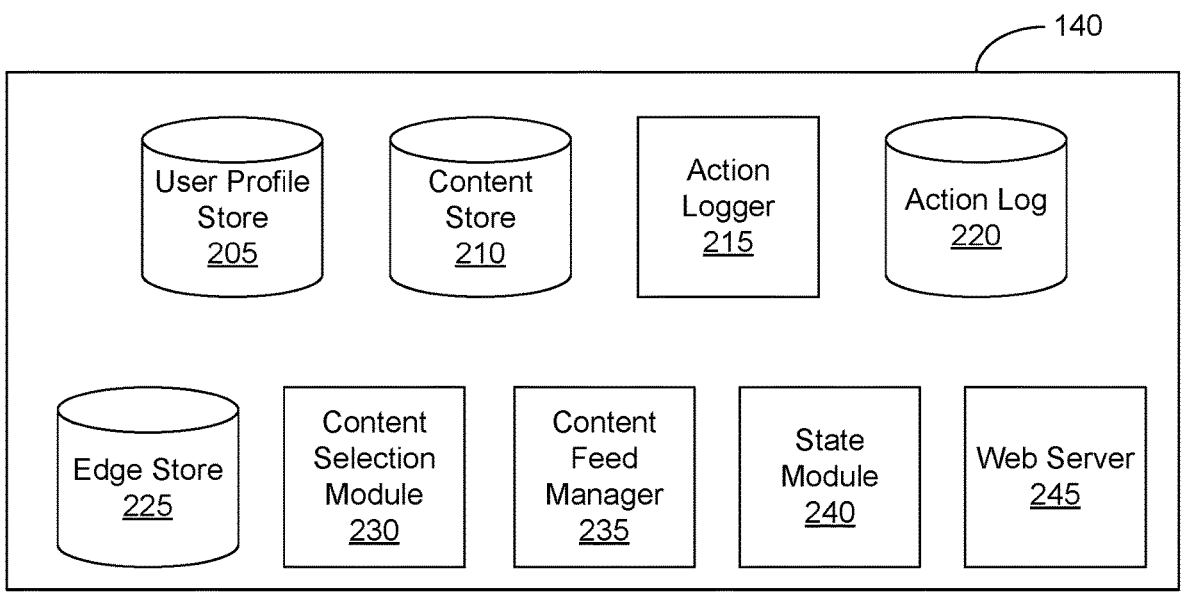
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a content selection module 230, a content feed manager 235, a state module 240, and a web server 245. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

In some embodiments, the action logger 215 receives communications about user actions with content presented to a user and populates the action log 220 with information about the actions. Examples of interactions with content include viewing content items, requesting additional content items for presentation, indicating a preference for a content item, sharing a content item with another user, or performing any other suitable action. A user may interact with content items by providing inputs to a client device 110 presenting content from the social networking system 140. The client device 110 identifies actions corresponding to various provided inputs and communicates information describing the identified actions to the action logger 215, which stores the information describing the identified actions in the action log 220.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the social networking system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate the user's interest in an object, in a topic, or in another user in the social networking system 140 based on actions performed by the user. Computation of affinity is further described in U.S. patent application Ser. No. 12/978,265, filed on December 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In various embodiments, the content selection module 230 determines an affinity score for each content item eligible for presentation to a viewing user based on a predicted likelihood of the viewing user interacting with the content item, and selects a plurality of content items for presentation to the viewing user based on the affinity score of each content item. For example, the content selection module 230 determines an affinity score for a content item that is proportional to a predicted likelihood of the viewing user clicking on the content item and selects content items associated with the highest affinity scores for presentation to the viewing user. The likelihood of a viewing user interacting with a content item may be predicted based on attributes associated with the viewing user's account on the social networking system 140 matching attributes of the content items. For example, interests and demographic information retrieved from a user profile associated with a viewing user (e.g., from the user profile store 205) is compared with metadata associated with a content item (e.g., tags associated with images included in the content item) and a likelihood of the viewing user interacting with the content item is predicted based on a degree of similarity between the information and the metadata.

The content selection module 230 selects one or more content items for communication to a client device 110 to be presented to a user. Content items eligible for presentation to the user are retrieved from the content store 210, from the ad request store 230, or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the viewing user. For example, the content selection module 230 determines measures of relevance of various content items to the user based on characteristics associated with the user by the social networking system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the social networking system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the social networking system 140. The feed may include one or more content items associated with bid amounts (i.e., "sponsored content items") as well as organic content items, such as stories describing actions associated with other social networking system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who are not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the social networking system 140.

In various embodiments, the content selection module 230 presents content to a user through a newsfeed including a plurality of content items selected for presentation to the user. One or more content items associated with bid amounts may be included in the feed. The content selection module 230 may also determine the order in which selected content items are presented via the feed. For example, the content selection module 230 orders content items in the feed based on likelihoods of the user interacting with various content items. In some embodiments, the content selection module 230 selects content items to be included in a newsfeed using a filtering process. For example, the content selection module 230 selects a set of content items that were not designated by a posting user providing the content item to the social networking system 140 as eligible for presentation in a user-specific profile feed associated with the posting user for inclusion in a newsfeed generated by the social networking system 140. In the preceding example, the social networking system 140 selects the set of content items not eligible for presentation in the user-specific profile feed based on a predicted affinity of the viewing user for the selected content items.

In various embodiments, the content selection module 230 also selects content items to be included in a user-specific profile feed associated with a posting user of the social networking system 140 for presentation to a viewing user of the social networking system 140. For example, a user-specific profile feed includes posts, status updates, images, videos, audio and any other content provided to the social networking system 140 by a posting user that were designated by the posting user as eligible for presentation in a user-specific profile feed associated with the posting user. In some embodiments, a user-specific profile feed may include content items also presented in a newsfeed generated by the social networking system 140 and presented to a viewing user of the social networking system 140. The content selection module 230 may select content items to be included in a user-specific profile feed if the social networking system 140 receives a request to present a viewing user with a user-specific profile feed. For example, if a viewing user requests a user-specific profile feed associated with a particular posting user connected to the viewing user on the social networking system 140, the content selection module 230 selects a set of content items received from the posting user that include designations made by the posting user indicating the content items are eligible to be presented by the social networking system 140 in a user-specific profile feed associated with the posting user. In the preceding example, the social networking system 140 selects the set of content items for presentation to the viewing user in the user-specific profile feed based on a predicted affinity of the viewing user for the selected content items.

In various embodiments, the social networking system 140 identifies a plurality of posting users connected to the viewing user on the social networking system 140 (e.g., by accessing information stored in the edge store 225) and the content selection module 230 retrieves a set of content items received from each posting user that were designated by the posting user as eligible for presentation in a user-specific profile feed associated with the posting user. For example, if the social networking system 140 receives a request to present a viewing user with a user-specific profile feed, the social networking system 140 identifies a group of posting users with whom a viewing user has interacted on the social networking system 140 at least a threshold number of times during a specified time interval based on information stored in association with connections between the viewing user and each posting user of the group. In this example, the content selection module 230 retrieves a set of content items received by the social networking system 140 from each posting user that were designated by the posting user as eligible for presentation in a user-specific profile feed associated with the posting user.

In various embodiments, the content feed manager 235 generates feeds of content items for presentation to a viewing user of the social networking system 140. Content items selected by the content selection manager 235 may be presented to a viewing user in a feed of content generated by the content feed manager 235 that is associated with the viewing user's account on the social networking system 140. For example, when a viewing user logs in to the social networking system 140 or otherwise requests content from the social networking system 140, the content selection module 230 retrieves content items maintained by the social networking system 140 (e.g., from the content store 210) and determines an affinity of the viewing user for each of the content items based on attributes associated with the viewing user's account on the social networking system 140 matching attributes of the content items. In this example, the content selection module 230 selects a set of the retrieved content items for which the viewing user has at least a threshold affinity and the content feed manager 235 generates a feed of content including the selected content items, which the social networking system 140 may provide to a client device 110 associated with the viewing user for presentation to the viewing user.

In various embodiments, the feed of content items generated by the content feed manager 235 is a feed of content associated with a social networking system user's account on the social networking system 140, such as a newsfeed. For example, the content feed manager 235 generates a newsfeed that is associated with a viewing user's account on the social networking system 140 and is presented to the viewing user on a profile page associated with the viewing user when the viewing user logs in to the social networking system 140. In some embodiments, the feed of content items generated by the content feed manager 235 is a user-specific profile feed. For example, once the content selection module 230 has retrieved a set of content items received from posting users including designations made by the posting users indicating that the content items are eligible for presentation in a user-specific profile feed associated with each posting user, the content feed manager 235 generates a user-specific profile feed that includes the set of content items for presentation to a viewing user.

User-specific profile feeds generated by the content feed manager 235 may include information identifying posting users from whom the content items included in the user-specific feeds were received, in various embodiments. Information identifying a posting user from whom a content item was received may include a name of the posting user, an image associated with the posting user's account on the social networking system 140, or any other suitable information used by the social networking system 140 to identify the posting user to a viewing user. The user-specific profile feed may include a graphical user interface that presents content items to a viewing user via a client device 110 associated with the viewing user and receives interactions of the viewing user with the user-specific profile feed. The graphical user interface may include various interactive elements that allow the viewing user to navigate through the user-specific profile feed to view content items included in the feed and to submit certain requests to the social networking system 140 related to the user-specific profile feed. For example, a viewing user may request a user-specific profile feed associated with a posting user connected to the viewing user on the social networking system 140 by selecting an image associated with the posting user's account on the social networking system 140 presented to the viewing user in a display area of the graphical user interface. As an additional example, a viewing user may express a preference for or comment on a content item included in a user-specific profile feed. In this example, the content feed manager 235 may generate a content item describing the action performed by the viewing user and update the user-specific profile feed to include the content item. The user-specific profile feed may also allow the viewing user to perform an action associated with a presented content item and to submit content items to the content feed manager 235 for presentation by the social networking system 140 to additional users of the social networking system 140. For example, the viewing user interacts with various interactive elements of the user-specific profile feed to indicate a preference for a content item included in the user-specific profile feed or to upload a content item associated with the viewing user for presentation by the social networking system 140 to additional social networking system users.

In some embodiments, the content feed manager 235 generates user-specific profile feeds that include information identifying posting users from whom content items included in the user-specific profile feeds were received and additional information identifying additional posting users from whom content items not included in the user-specific profile feeds were received. For example, the user-specific profile feed includes information identifying a posting user and one or more additional posting users connected to the viewing user on the social networking system 140 and content items received from the former posting user, but not the latter posting users. In some embodiments, when the social networking system 140 receives an interaction of the viewing user with information identifying an additional posting user included in the user-specific profile feed, the content selection module 230 retrieves a set of content items received from the additional posting user and the content feed manager 235 updates the user-specific profile feed to include the set of content items. For example, if a user-specific profile feed includes information identifying an additional posting user not associated with content items already included in the user-specific profile feed, a graphical user interface included in the user-specific profile feed allows the viewing user to request content items received from the additional posting user by interacting with the information identifying the additional posting user. In this example, the content feed manager 235 updates the user-specific profile feed to include additional content items received from the additional posting user in the user-specific profile feed when the viewing user interacts with the information identifying the additional posting user included in the user-specific profile feed.

In embodiments in which the user-specific profile feed includes information identifying more than one posting user, the content feed manager 235 may order the information identifying each posting based on a predicted affinity of the viewing user for each of the posting users. For example, based on a predicted affinity of a viewing user for each posting user connected to the viewing user, the content feed manager 235 includes information identifying each of the posting users in in a multi-column list included in the user-specific profile feed. In this example, information identifying each posting user is organized by the content feed manager 235 such that the prominence of the information associated with posting users is proportional to the predicted affinity of the viewing user for each posting user. The affinity of the viewing user for a posting user may be predicted based on interactions between the viewing user and the posting user on the social networking system 140 (e.g., a number or frequency of messages sent between the users on the social networking system 140).

In some embodiments, the predicted affinity of a viewing user for a posting user is expressed as an affinity score that is based on an amount of interactions between the viewing user and the posting user. For example, the social networking system 140 ranks posting users based on an affinity score determined for each posting user and the content feed manager 235 orders the information identifying each posting user in the user-specific profile feed based on the rank of each posting user. In some embodiments, the social networking system 140 may bias an affinity score for a posting user based on an amount of time that has elapsed between an occurrence of an interaction between a viewing user and a posting user and/or based on an amount of time that has elapsed since the affinity score was determined. For example, the greater the amount of time that has elapsed since the most recent interaction between a viewing user and a posting user, the lower the affinity score for the posting user.

The state module 240 determines a visitation state describing presentation of a user-specific profile feed to a viewing user of the social networking system 140. A visitation state describing presentation of a user-specific profile feed to a viewing user includes a description of the viewing user who was presented with the user-specific profile feed. For example, a visitation state associated with a user-specific profile feed includes user identifying information (e.g., a user name or user ID) associated with a viewing user who was presented with the user-specific profile feed. In various embodiments, a visitation state may also include additional types of information describing presentation of a user-specific profile feed to a viewing user. For example, a visitation state may describe a frequency with which a viewing user was presented with a user-specific profile feed, a time when the viewing user was presented with the feed, and types of interactions performed by the viewing user with the feed (e.g., selections of content items presented in the feed, expressions of preference for content items presented in the feed, etc.).

The state module 240 may determine a visitation state by accessing the user profile store 205, the action log 220, and/or the edge store 225. For example, to identify viewing users presented with a user-specific profile feed, the state module 240 accesses information stored in association with an edge between an object representing a user-specific profile feed and objects representing user profiles associated with the viewing users of the social networking system 140 from the edge store 225. As an additional example, the state module 240 determines a visitation state describing presentation of a user-specific profile feed to viewing users by retrieving information stored in the action log 220 describing various types of actions performed by viewing users with the user-specific profile feed and identifies times the actions were performed and a user identifier associated with each action from the retrieved information.

In various embodiments, the state module 240 stores a visitation state describing presentation of a user-specific profile feed to a viewing user of the social networking system 140 in association with the user-specific profile feed; the visitation state is stored for each viewing user presented with the user-specific profile feed. For example, the state module 240 stores information identifying a viewing user presented with a user-specific profile feed and a time associated with the presentation in association with an object representing the user-specific profile feed (e.g., in the content store 210). In some embodiments, the state module 240 stores the visitation state in association with a content item included in the user-specific profile feed and/or in association with an account on the social networking system 140 associated with the posting user from whom the content item was received. For example, the state module 240 stores a visitation state in association with an object representing a content item included in a user-specific profile feed presented to a viewing user (e.g., in the content store 210). In this example the state module 240 also or alternatively may store the visitation state in association with a user profile associated with the viewing user and/or a posting user from whom the content item was received (e.g., in the user profile store 205).

The web server 245 links the social networking system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the social networking system 140 and the client device 110; for example, the messages are instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, WEBOS® or BlackberryOS.

Figure 3:
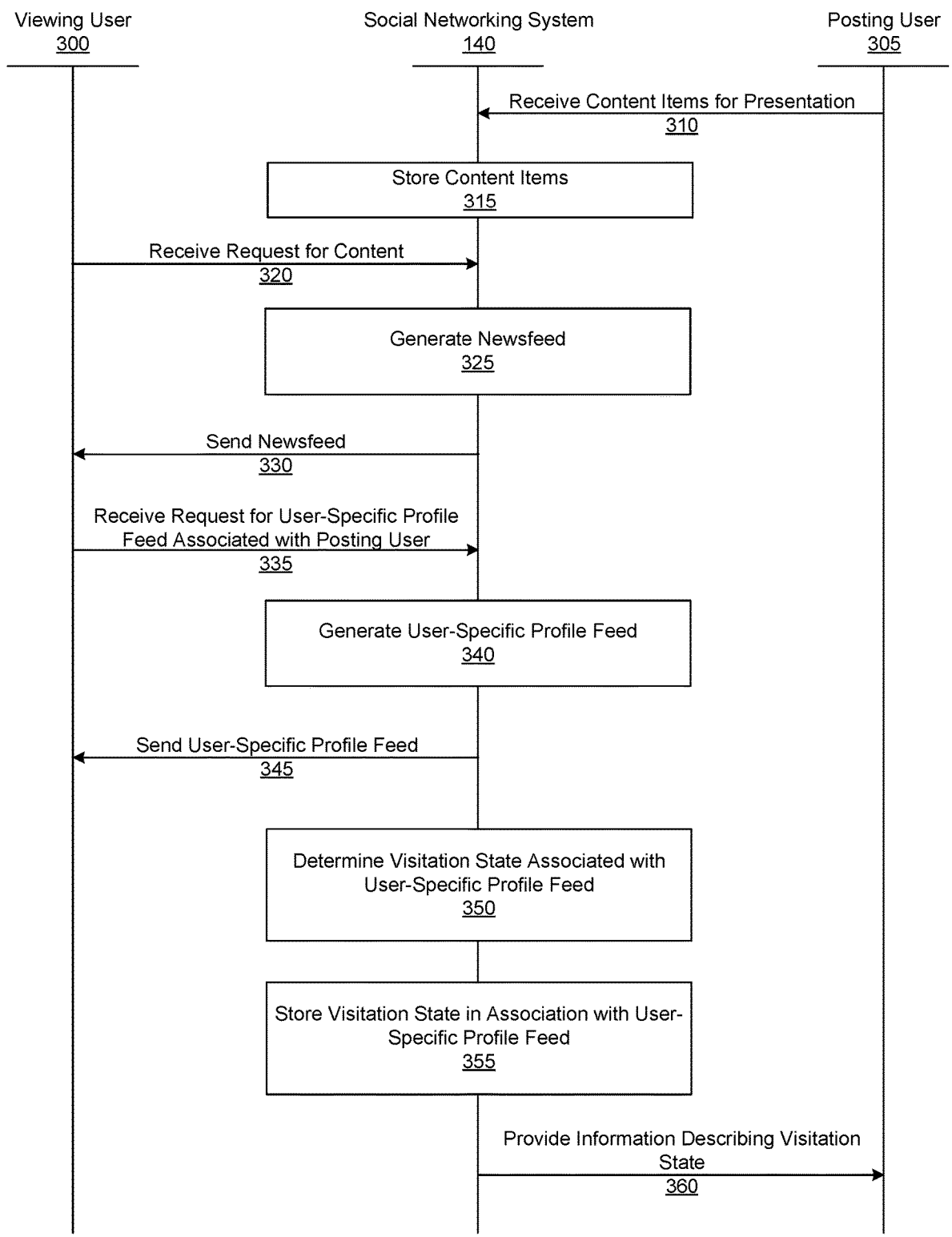
FIG. 3 is an interaction diagram of a method for generating and presenting a user-specific profile feed associated with a visitation state to a user of a social networking system, in accordance with an embodiment.

Generating a User-Specific Profile Feed Associated with a Visitation State for Presentation to a User of a Social Networking System FIG. 3 is an interaction diagram of a method for generating a user-specific profile feed associated with a visitation state for presentation to a user of a social networking system 140. In other embodiments, the method may include different and/or additional steps than those shown in FIG. 3. Additionally, steps of the method may be performed in different orders than the order described in conjunction with FIG. 3 in various embodiments.

The social networking system 140 receives 310 a plurality of content items from a posting user 305 of the social networking system 140. One or more of the content items are designated by the posting user 305 as eligible for presentation by the social networking system 140 in a user-specific profile feed associated with the posting user 305. For example, a posting user 305 uploads content items to the social networking system 140 via a user-interface presented to the posting user 305 when the posting user 305 logs in to the social networking system 140. In the preceding example, the posting user 305 may select an interactive radio-button included in the user-interface that designates the content items uploaded via the user-interface as eligible for presentation in a user-specific profile feed associated with the posting user 305. In various embodiments, content items that may be received from a posting user 305 include location check-ins, posts, status updates, images, videos, audio and any other content items the posting user 305 wishes to share with additional users of the social networking system 140. The social networking system 140 stores 315 the plurality of content items received 310 from the posting user 305 and maintains the content items for later retrieval. For example, the content items may be stored 315 in the content store 210 in association with information identifying the posting user 305 from whom the content items were received 310.

At various times, the social networking system 140 receives 320 a request to present a newsfeed to a viewing user 300 of the social networking system 140. For example, the social networking system 140 receives 320 a request to present a viewing user 300 with a newsfeed associated with the viewing user's account on the social networking system 140 when the viewing user 300 logs in to the social networking system 140 or when the social networking system 140 receives a request from the viewing user 300 to view a profile page associated with the viewing user 300. In response to receiving 320 the request to present the viewing user 300 with a newsfeed, the social networking system 140 identifies content items associated with targeting criteria (e.g., age, geographic location, etc.) satisfied by the viewing user 300 as eligible for presentation to the viewing user 300 in a newsfeed. For example, the social networking system 140 identifies posts, status updates, images, videos, audio and any other content items generated by the social networking system 140 or received from additional users connected to the viewing user 300 on the social networking system 140 associated with targeting criteria satisfied by the viewing user 300. If the identified content items include content items received 310 from the posting user 305, the social networking system 140 excludes content items that were designated by the posting user 305 as eligible for presentation in a user-specific profile feed from being included in the newsfeed. For example, the social networking system 140 identifies a set of content items received 310 from the posting user 305 that were not designated as eligible for presentation in a user-specific profile feed associated with the posting user 305 if at least a threshold amount of targeting criteria associated with the set of content items are satisfied by the viewing user 300.

When the social networking system 140 has identified content items eligible for presentation to the viewing user 300 in a newsfeed, the social networking system 140 selects a set of the identified content items for inclusion in the newsfeed. The social networking system 140 may select one or more of the set of content items based on predicted likelihoods of the viewing user 300 interacting with the content items. For example, the social networking system 140 predicts likelihoods that the viewing user 300 will interact with a content item based on attributes associated with the viewing user's account on the social networking system 140 that match attributes of the content item and includes content items associated with at least a threshold likelihood in the newsfeed. In various embodiments, the social networking system 140 determines an affinity score for each content item identified as eligible for presentation to the viewing user 300 based on a predicted likelihood of the viewing user 300 interacting with the content item, and selects a set of the identified content items for presentation to the viewing user 300 via the newsfeed based on the affinity score of each content item. For example, the social networking system 140 ranks content items based on their affinity scores and selects a set of content items associated with at least a threshold ranking for presentation to the viewing user 300 via the newsfeed.

The social networking system 140 generates 325 a newsfeed comprising the selected set of content items and sends 330 the generated newsfeed for display to the viewing user 300. For example, the newsfeed is communicated to a client device 110 associated with the viewing user 300 for presentation in a display area of the client device 110 by an application associated with the social networking system 140 executing on the client device 110. In addition to the selected set of content items, the newsfeed includes information identifying a posting user 305 connected to the viewing user 300 on the social networking system 140 and a graphical user interface for receiving interactions of the viewing user 300 with the newsfeed, in some embodiments. Information identifying a posting user 305 connected to the viewing user 300 on the social networking system 140 may include a name of the posting user 305, an image associated with the posting user's account on the social networking system 140, or any other suitable information for identifying the posting user 305 to the viewing user 300.

Figure 4:
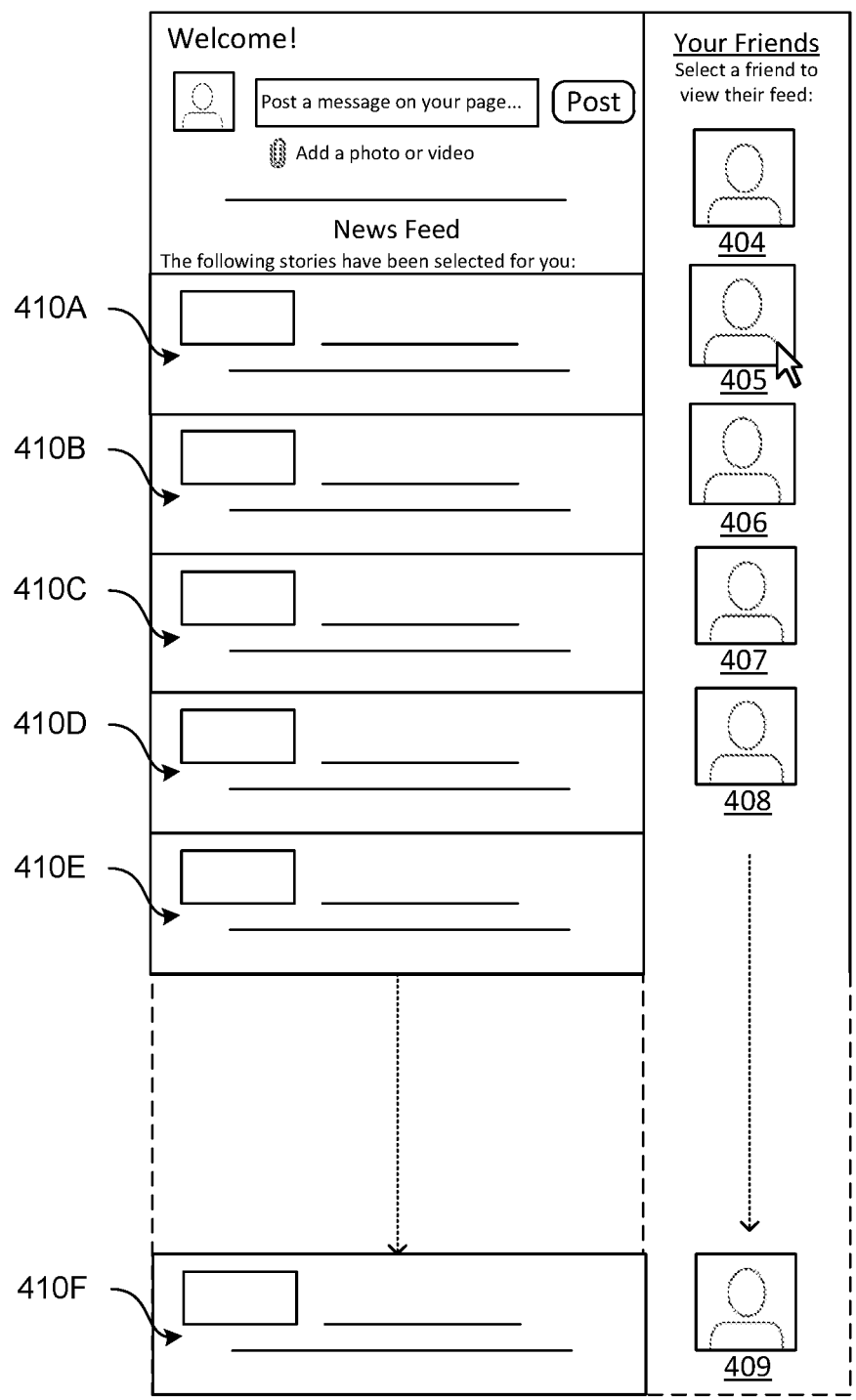
FIG. 4 is an example of a newsfeed including interactive elements allowing a viewing user to request a user-specific profile feed associated with a posting user connected to the viewing user on a social networking system, in accordance with an embodiment.

As shown in the example of FIG. 4, the newsfeed sent 330 to the viewing user 300 includes multiple content items 410A-F selected by the social networking system 140 for presentation to the viewing user 300. A graphical user interface included in the newsfeed may include various interactive elements allowing the viewing user 300 to navigate through the newsfeed to view the multiple content items 410A-F presented in the newsfeed and to request a user-specific profile feed associated with a posting user 305 connected to the viewing user 300 on the social networking system 140. For example, a viewing user 300 requests a user-specific profile feed associated with a posting user 305 connected to the viewing user 300 on the social networking system 140 by selecting an image 404-409 associated with the posting user's account on the social networking system 140 presented in a display area of a graphical user interface included in the newsfeed.

In embodiments in which the newsfeed includes information identifying more than one posting user connected to the viewing user 300 on the social networking system 140, the social networking system 140 may order the information identifying each posting user in the newsfeed based on a predicted affinity of the viewing user 300 for each posting user. For example, referring to FIG. 4, based on a predicted affinity of the viewing user 300 for each posting user connected to the viewing user 300, the social networking system 140 organizes images 404-409 identifying each posting user such that the prominence of an image 404-409 associated with a posting user is proportional to a predicted affinity of the viewing user 300 for the posting user. In this example, since the images 404-409 identifying posting users are arranged vertically along a side of the newsfeed, the top-most image 404 is associated with a posting user for whom the viewing user 300 has the greatest predicted affinity, followed by the second top-most image 405, which is associated with a posting user for whom the viewing user 300 has a lower predicted affinity.

An affinity of the viewing user 300 for a posting user 305 may be predicted by the social networking system 140 based on interactions between the viewing user 300 and the posting user 305 on the social networking system 140 (e.g., a number or frequency of content items shared between the users). In some embodiments, a predicted affinity of the viewing user 300 for a posting user 305 is expressed as an affinity score that is based on an amount or frequency of interactions between the viewing user 300 and the posting user 305. For example, the social networking system 140 ranks posting users based on an affinity score determined for each posting user and orders information identifying each posting user in the newsfeed based on the rank of each posting user.

Referring back to FIG. 3, the social networking system 140 receives 335 a request to present the viewing user 300 with a user-specific profile feed associated with the posting user 305 from whom the plurality of content items were received 300. For example, the social networking system 140 receives 335 an interaction of the viewing user 300 with information associated with an identity of the posting user 305 (e.g., a profile image associated with the posting user's account on the social networking system 140) which is presented in a display area of the newsfeed provided to the viewing user 300. In the preceding example, the interaction of the viewing user 300 with information identifying the posting user 305 in the newsfeed communicates a request to the social networking system 140 to present the viewing user 300 with a user-specific profile feed associated with the posting user 305.

While the social networking system 140 may receive 335 a request to present the viewing user 300 with a user-specific profile feed based on interactions performed by the viewing user 300 with information included in a newsfeed, the social networking system 140 may also receive 335 the request based on interactions performed by the viewing user 300 with various other objects maintained by the social networking system 140, in some embodiments. For example, the social networking system 140 receives 335 the request from the viewing user 300 based on an interaction of the viewing user 300 with an interactive element included in a graphical user interface presenting the viewing user 300 with a profile page associated with the posting user 305.

In response to receiving 335 the request, the social networking system 140 identifies one or more content items received 310 from the posting user 305 that were designated as eligible for presentation in a user-specific profile feed associated with the posting user 305 and selects a set of the identified content items for inclusion in the user-specific profile feed. In some embodiments, the social networking system 140 selects the set of content items based on predicted likelihoods of the viewing user 300 interacting with the content items. For example, the social networking system 140 predicts likelihoods that the viewing user 300 will interact with a content item based on attributes associated with the viewing user's account on the social networking system 140 that match attributes of the content item and includes content items associated with at least a threshold likelihood in the user-specific profile feed. In various embodiments, the social networking system 140 determines an affinity score for each content item identified as eligible for presentation in the user-specific profile feed based on a predicted likelihood of the viewing user 300 interacting with the content item, and selects a set of the identified content items for inclusion in the user-specific profile feed based on the affinity score of each content item. For example, the social networking system 140 ranks content items based on their affinity scores and selects a set of content items associated with at least a threshold ranking for presentation to the viewing user 300 via the user-specific profile feed.

The social networking system 140 generates 340 the user-specific profile feed comprising the selected set of content items and sends 345 the user-specific profile feed presenting one or more of the set of content items at a time for display to the viewing user 300. For example, the user-specific profile feed is communicated to a client device 110 associated with the viewing user 300 for presentation in a display area of the client device 110 by an application associated with the social networking system 140 executing on the client device 110. In addition to the selected set of content items, the user-specific profile feed includes information identifying the posting user 305 from whom the content items were received. Information identifying the posting user 305 may include a name of the posting user 305, an image associated with the posting user's account on the social networking system 140, or any other suitable information for identifying the posting user 305 to the viewing user 300.

In various embodiments, the user-specific profile feed also includes a graphical user interface having various navigational elements allowing the viewing user 300 to navigate through the user-specific profile feed to display content items included in the user-specific profile feed. For example, the viewing user 300 navigates through the user-specific profile feed by performing a swiping gesture in a display area of a client device 110 presenting the user-specific profile feed to cycle each of a plurality of content items included in the user-specific profile feed into the display area for presentation. In various embodiments, the user-specific profile feed also allows the viewing user 300 to perform an action associated with a presented content item and to submit additional content items to the social networking system 140 for presentation by the social networking system 140. For example, the viewing user 300 interacts with various interactive elements of the user-specific profile feed to indicate a preference for a content item presented in the user-specific profile feed or to upload a content item associated with the viewing user 300 for presentation by the social networking system 140.

Figure 5B:
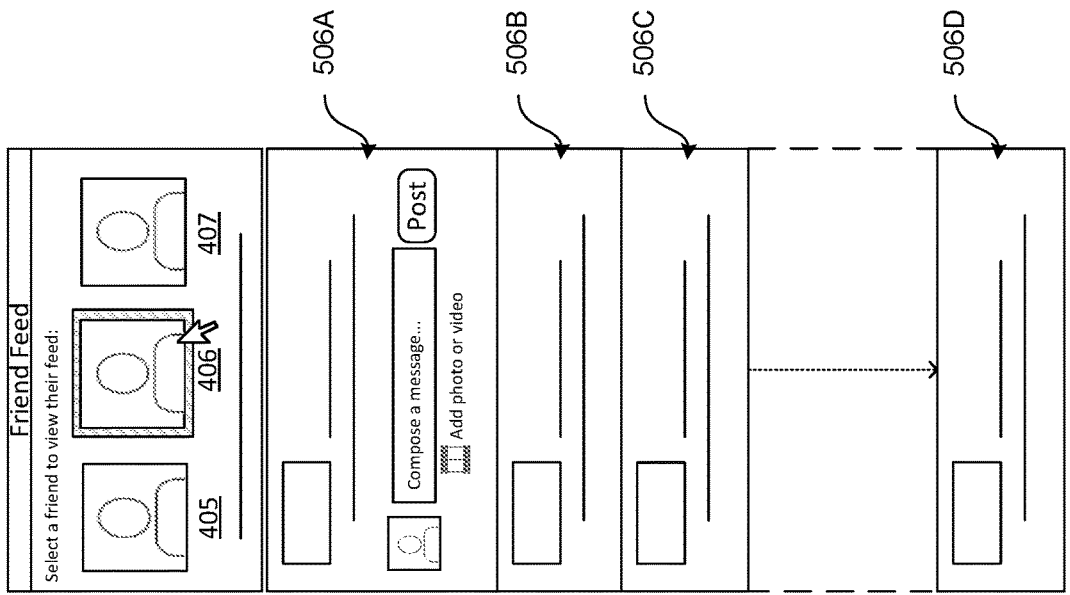
FIG. 5B is an additional example of a user-specific profile feed presented to a viewing user of a social networking system, in accordance with an embodiment.
Figure 5A:
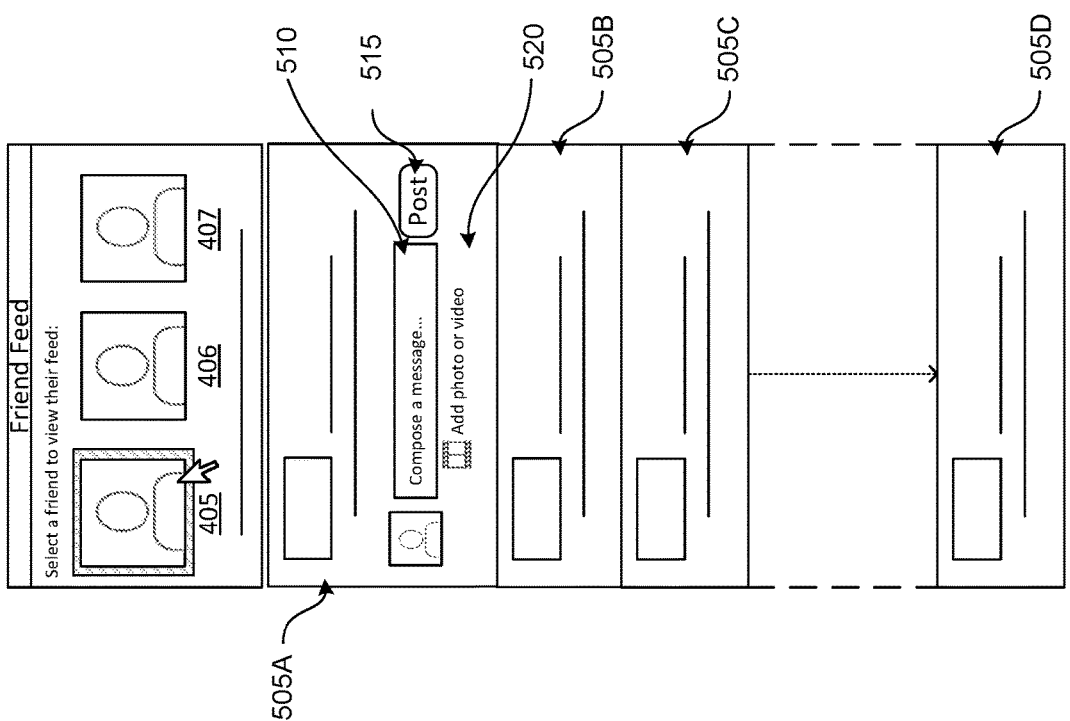
FIG. 5A is an example of a user-specific profile feed presented to a viewing user of a social networking system, in accordance with an embodiment.

For example, as illustrated in FIG. 5A, the user-specific profile feed includes multiple content items 505A-D received 310 from the posting user 305 which were designated by the posting user 305 as eligible for presentation in the user-specific profile feed. A graphical user interface included in the user-specific profile feed includes various interactive elements allowing the viewing user 300 to navigate through the user-specific profile feed to view the multiple content items 505A-D, to perform an action associated with a presented content item 505A-D, and to submit additional content items to the social networking system 140 for presentation by the social networking system 140. For example, the viewing user 300 may interact with a text box 510 and hyperlinked button 515 included in the user-specific profile feed to compose and share a message on the social networking system 140 in conjunction with the user-specific profile feed or a particular content item 505A presented in the user-specific profile feed. In this example, the social networking system 140 may generate a content item including the message composed by the viewing user 300 and update the user-specific profile feed to include the content item. As another example, the viewing user 300 may interact with a hyperlinked text box 520 to upload and share a photo or video on the social networking system 140 in conjunction with the user-specific profile feed or a particular content item 505A presented in the user-specific profile feed. In this example, the social networking system 140 may generate a content item including the uploaded photo or video and update the user-specific profile feed to include the content item.

In some embodiments, the user-specific profile feed also allows the viewing user 300 to request additional user-specific profile feeds including content items received from additional posting users connected to the viewing user 300 on the social networking system 140. If the user-specific profile feed allows the viewing user 300 to request additional user-specific profile feeds associated with additional posting users, information identifying the additional posting users may be presented to the viewing user 300 in conjunction with the user-specific profile feed. For example, the social networking system 140 accesses a social graph maintained by the social networking system 140 that describes connections between the viewing user 300 and additional posting users who have provided content items designated as eligible for presentation in a user-specific profile feed and includes information identifying the additional posting users in the user-specific profile feed. In one embodiment, hyperlinked images or text boxes with which the viewing user 300 may interact to request additional user-specific profile feeds associated with additional posting users are presented in a display area of the user-specific profile feed to identify the additional posting users to the viewing user 300. For example, as illustrated in FIG. 5A, the viewing user 300 requests an additional user-specific profile feed associated with an additional posting user connected to the viewing user 300 on the social networking system 140 by selecting an image 405-407 associated with an additional posting user's account on the social networking system 140 presented in a display area of a graphical user interface included in the user-specific profile feed.

In some embodiments, information identifying additional posting users connected to the viewing user 300 on the social networking system 140 is presented in the user-specific profile feed in an order based on a predicted affinity of the viewing user 300 for each of the additional posting users. For example, information identifying a plurality of additional posting users is presented to the viewing user 300 in a multi column list included a display area of the user-specific profile feed such that each column of the list identifies an additional posting user connected to the viewing user 300 on the social networking system 140. In this example, information identifying an additional posting user for whom the viewing user 300 has a higher affinity is presented in a column of the list that is more prominent in the display area of the user-specific profile feed than information identifying an additional posting user for whom the viewing user 300 has a lower affinity. In the example of FIG. 5A, the social networking system 140 organizes images 405-407 identifying additional posting users in the user-specific profile feed such that the prominence of each image in a display area of the user-specific profile feed is proportional to a predicted affinity of the viewing user 300 for each additional posting user. In this example, since the images 405-407 identifying the additional posting users are arranged horizontally, the left-most image 405 is associated with an additional posting user for whom the viewing user 300 has the greatest predicted affinity, followed by the second left-most image 406, which is associated with an additional posting user for whom the viewing user 300 has less than the greatest predicted affinity.

An affinity of the viewing user 300 for an additional posting user may be predicted by the social networking system 140 based on a number or frequency of interactions between the viewing user 300 and the additional posting user on the social networking system 140. In some embodiments, a predicted affinity of the viewing user 300 for an additional posting user is expressed as an affinity score based on interactions between the viewing user 300 and the additional posting user. For example, the social networking system 140 ranks various additional posting users based on an affinity score determined for each additional posting user and orders the additional information identifying each additional posting user in the user-specific profile feed based on the rank of each additional posting user.

If the social networking system 140 receives an interaction of the viewing user 300 with information included in the user-specific profile feed identifying an additional posting user, the social networking system 140 identifies and selects content items received from the additional posting user designated by the additional posting user as eligible for presentation in a user-specific profile feed associated with the additional posting user. In some embodiments, the social networking system 140 updates the user-specific profile feed to include the selected set of content items. In other embodiments, the social networking system generates an additional user-specific profile feed associated with the additional posting user and sends the additional user-specific profile feed for display to the viewing user 300. For example, as illustrated in FIG. 5B, if the social networking system 140 receives an interaction of the viewing user 300 with a selectable image 406 identifying an additional posting user included in the user-specific profile feed, the social networking system 140 generates an additional user-specific profile feed associated with the additional posting user and sends the additional user-specific profile feed for display to the viewing user 300. In this example, the additional user-specific profile feed includes content items 506A-D which were designated by the additional posting user as eligible for presentation in a user-specific profile feed associated with the additional posting user and which were not presented in the newsfeed or the user-specific profile feed previously sent 345 to the viewing user 300.

Referring again to FIG. 3, the social networking system 140 determines 350 a visitation state describing presentation of the user-specific profile feed to the viewing user 300. In various embodiments, the visitation state includes information associated with an identity of the viewing user 300 on the social networking system 140. For example, the visitation state includes a user name or user identifier associated with an account or profile of the viewing user 300 on the social networking system. In various embodiments, the visitation state also includes additional types of information describing presentation of the user-specific profile feed to the viewing user 300. For example, the visitation state describes a number of times the user-specific profile feed was presented to the viewing user 300, a time of day of each presentation, and types of interactions performed by the viewing user 300 with the user-specific profile feed or with individual content items included in the user-specific profile feed. For example, the visitation state includes a user identifier associated with the viewing user 300, a number of times the viewing user 300 was presented with the user-specific profile feed, and messages shared on the social networking system 140 in conjunction with the user-specific profile feed or a particular content item presented in the user-specific profile feed.

In some embodiments, the social networking system 140 determines 350 the visitation state based on information stored in the user profile store 205, the action log 220, and/or the edge store 225. For example, the social networking system 140 determines 350 user identifying information associated with the viewing user 300 presented with the user-specific profile feed based on user identifying information stored in association with an edge between an object representing the user-specific profile feed and an object representing a user profile associated with the viewing user 300 (e.g., in the edge store 225). In this example, the social networking system 140 may also retrieve information stored in the action log 220 describing various types of actions performed by the viewing user 300 with the user-specific profile feed and times the actions were performed.

In various embodiments, the social networking system 140 stores 355 the determined visitation state describing presentation of the user-specific profile feed to the viewing user 300 in association with the user-specific profile feed. For example, the visitation state describing presentation of the user-specific profile feed to the viewing user 300 is stored 355 at the social networking system 140 in association with an object representing the user-specific profile feed (e.g., in the content store 210). In some embodiments, the visitation state is stored 355 in association with a content item included in the user-specific profile feed (e.g., in the content store 210). In yet other embodiments, the visitation state is stored 355 by the social networking system 140 in association with an account on the social networking system 140 associated with the viewing user 300 and/or the posting user 305 from whom the content items included in the user-specific profile feed were received (e.g., in the user profile store 205).

At various times, the social networking system 140 sends 360 the visitation state to the posting user 305 to provide the posting user 305 with information describing presentation of the user-specific profile feed to the viewing user 300. For example, the social networking system 140 presents the posting user 305 with the visitation state when the posting user 305 logs in to an account on the social networking system 140 associated with the posting user 305 (e.g., as a message on a profile page associated with the posting user 305). As an additional example, the visitation state is sent 360 by the social networking system 140 as a notification to the posting user 305 when the user-specific profile feed is presented to the viewing user 300. Hence, the social networking system 140 generates 340 and provides the viewing user 300 with a user-specific profile feed associated with the posting user 305 in response to receiving 335 a request from the viewing user 300 for the user-specific profile feed and provides 360 the posting user 305 with information describing presentation of the user-specific profile feed to the viewing user 300.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving a plurality of content items from a posting user of a social networking system, one or more of the plurality of content items designated as eligible for presentation in a user-specific profile feed associated with the posting user;
    selecting, from the plurality of content items, a set of content items not designated as eligible for presentation in the user-specific profile feed associated with the posting user;
    generating a newsfeed comprising the set of content items;
    sending the newsfeed for display to a first viewing user of the social networking system, the first viewing user connected to the posting user on the social networking system;
    receiving a request to present a second viewing user of the social networking system with the user-specific profile feed associated with the posting user, the second viewing user connected to the posting user on the social networking system;
    generating the user-specific profile feed associated with the posting user, the user-specific profile feed comprising a content item of the one or more content items designated as eligible for presentation in the user-specific profile feed;
    sending the user-specific profile feed for display to the second viewing user;
    receiving a request to present the second viewing user with an updated user-specific profile feed including both the content item designated as eligible for presentation in the user-specific profile feed and content items associated with an additional posting user that are designated as eligible for presentation in the user-specific profile feed;
    sending the updated user-specific profile feed to the second viewing user, the updated user-specific profile feed including the content item of the one or more content items designated as eligible for presentation in the user-specific profile feed associated with the posting user and the content items associated with the additional posting user;
    storing, without the second viewing user posting to the user-specific profile feed, a visitation state of the user-specific profile feed, the visitation state comprising information describing presentation of the user-specific profile feed to the second viewing user and indicating a frequency with which the updated user-specific profile feed was displayed to the second viewing user; and
    sending a notification including the visitation state to the posting user and the additional posting user, wherein the visitation state informs the posting user and the additional posting user that the second viewing user was presented with the updated user-specific profile feed and indicates the frequency with which the updated user-specific profile feed was displayed to the second viewing user.

2. The method of claim 1, wherein the user-specific profile feed further comprises information associated with an identity of the posting user.

3. The method of claim 2, wherein the information associated with an identity of the posting user comprises one or more selected from a group consisting of: an image associated with a user account on the social networking system associated with the posting user, a user name associated with the user account on the social networking system associated with the posting user, and any combination thereof.

4. The method of claim 2, further comprising:
    identifying the additional posting user of the social networking system connected to the second viewing user on the social networking system; and
    presenting additional information associated with an identity of the additional posting user in conjunction with the user-specific profile feed.

5. The method of claim 4, wherein the information associated with an identity of the posting user and the additional information associated with an identity of the additional posting user is presented in conjunction with the user-specific profile feed in an order based on a predicted affinity of the second viewing user for each of the posting user and the additional posting user.

6. The method of claim 5, further comprising:
    determining an amount of interactions between the second viewing user and each of the posting user and the additional posting user on the social networking system;
    ranking the posting user and the additional posting user based on the amount of interactions between the viewing user and each of the posting user and the additional posting user on the social networking system; and
    ordering the information associated with an identity of the posting user and the additional information associated with an identity of the additional posting user presented in conjunction with the user-specific profile feed based on the ranking.

7. The method of claim 6, wherein ranking the posting user and the additional posting user is further based on an amount of time between: (a) an interaction between the second viewing user and each of the posting user and the additional posting user on the social networking system; and (b) a time of the ranking.

8. The method of claim 4, further comprising:
    receiving an interaction of the second viewing user with the additional information associated with an identity of the additional posting user;
    responsive to receiving the interaction, retrieving an additional set of content items received by the social networking system from the additional posting user, at least one content item of the additional set of content items not presented in the newsfeed;
    presenting the second viewing user with an additional user-specific profile feed comprising the at least one content item of the additional set of content items not presented in the newsfeed;
    storing an additional visitation state of the additional user-specific profile feed, the additional visitation state comprising information describing presentation of the additional user-specific profile feed to the second viewing user; and sending the additional visitation state to the additional posting user.

9. The method of claim 1, wherein the request to present the second viewing user with the user-specific profile feed is received via a profile page associated with the posting user.

10. The method of claim 1, wherein the visitation state comprises one or more selected from a group consisting of: a name of the second viewing user, a time the user-specific profile feed was presented to the second viewing user, a number of times the user-specific profile feed was presented to the second viewing user, an interaction with the user-specific profile feed by the second viewing user, and any combination thereof.

11. A computer program product comprising a non-transitory computer readable storage medium having instructions encoded thereon that, when executed by a processor, cause the processor to:
   receive a plurality of content items from a posting user of a social networking system, one or more of the plurality of content items designated as eligible for presentation in a user-specific profile feed associated with the posting user;
   select, from the plurality of content items, a set of content items not designated as eligible for presentation in the user-specific profile feed associated with the posting user;
   generate a newsfeed comprising the set of content items;
   send the newsfeed for display to a first viewing user of the social networking system, the first viewing user connected to the posting user on the social networking system;
   receive a request to present a second viewing user of the social networking system with the user-specific profile feed associated with the posting user, the second viewing user connected to the posting user on the social networking system;
   generate the user-specific profile feed associated with the posting user, the user-specific profile feed comprising a content item of the one or more content items designated as eligible for presentation in the user-specific profile feed;
   send the user-specific profile feed for display to the second viewing user;
   receive a request to present the second viewing user with an updated user-specific profile feed including both the content item designated as eligible for presentation in the user-specific profile feed and content items associated with an additional posting user that are designated as eligible for presentation in the user-specific profile feed;
   send the updated user-specific profile feed to the second viewing user, the updated user-specific profile feed including the content item of the one or more content items designated as eligible for presentation in the user-specific profile feed associated with the posting user and the content items associated with the additional posting user;
   store, without the second viewing user posting to the user-specific profile feed, a visitation state of the user-specific profile feed, the visitation state comprising information describing presentation of the user-specific profile feed to the second viewing user and indicating a frequency with which the updated user-specific profile feed was displayed to the second viewing user; and
   send a notification including the visitation state to the posting user and the additional posting user, wherein the visitation state informs the posting user and the additional posting user that the second viewing user was presented with the updated user-specific profile feed and indicates the frequency with which the updated user-specific profile feed was displayed to the second viewing user.

12. The computer program product of claim 11, wherein the user-specific profile feed further comprises information associated with an identity of the posting user.

13. The computer program product of claim 12, wherein the information associated with an identity of the posting user comprises one or more selected from a group consisting of: an image associated with a user account on the social networking system associated with the posting user, a user name associated with the user account on the social networking system associated with the posting user, and any combination thereof.

14. The computer program product of claim 12, wherein the computer readable storage medium has instructions encoded thereon that, when executed by a processor, further cause the processor to:
   identify the additional posting user of the social networking system connected to the second viewing user on the social networking system; and
   present additional information associated with an identity of the additional posting user in conjunction with the user-specific profile feed.

15. The computer program product of claim 14, wherein the information associated with an identity of the posting user and the additional information associated with an identity of the additional posting user is presented in conjunction with the user-specific profile feed in an order based on a predicted affinity of the second viewing user for each of the posting user and the additional posting user.

16. The computer program product of claim 15, wherein the computer readable storage medium has instructions encoded thereon that, when executed by a processor, further cause the processor to:
   determine an amount of interactions between the second viewing user and each of the posting user and the additional posting user on the social networking system;
   rank the posting user and the additional posting user based on the amount of interactions between the viewing user and each of the posting user and the additional posting user on the social networking system; and
   order the information associated with an identity of the posting user and the additional information associated with an identity of the additional posting user presented in conjunction with the user-specific profile feed based on the ranking.

17. The computer program product of claim 16, wherein rank the posting user and the additional posting user is further based on an amount of time between:
   (a) an interaction between the second viewing user and each of the posting user and the additional posting user on the social networking system; and (b) a time of the ranking.

18. The computer program product of claim 14, wherein the computer readable storage medium has instructions encoded thereon that, when executed by a processor, further cause the processor to:
   receive an interaction of the second viewing user with the additional information associated with an identity of the additional posting user;
   responsive to receiving the interaction, retrieve an additional set of content items received by the social networking system from the additional posting user, at least one content item of the additional set of content items not presented in the newsfeed;

present the second viewing user with an additional user-specific profile feed comprising the at least one content item of the additional set of content items not presented in the newsfeed;

store an additional visitation state of the additional user-specific profile feed, the additional visitation state comprising information describing presentation of the additional user-specific profile feed to the second viewing user; and send the additional visitation state to the additional posting user.

19. The computer program product of claim 11, wherein the request to present the second viewing user with the user-specific profile feed is received via a profile page associated with the posting user.

20. The computer program product of claim 11, wherein the visitation state comprises one or more selected from a group consisting of: a name of the second viewing user, a time the user-specific profile feed was presented to the second viewing user, a number of times the user-specific profile feed was presented to the second viewing user, an interaction with the user-specific profile feed by the second viewing user, and any combination thereof.

21. A method comprising:

receiving a plurality of content items from a posting user of a social networking system, one or more of the plurality of content items designated as eligible for presentation in a user -specific profile feed associated with the posting user;

receiving a request to present a viewing user of the social networking system with the user -specific profile feed associated with the posting user, the viewing user connected to the posting user on the social networking system;

generating the user-specific profile feed associated with the posting user, the user-specific profile feed comprising a content item of the one or more content items designated as eligible for presentation in the user-specific profile feed;

sending the user-specific profile feed for display to the viewing user;

receiving a request to present the viewing user with an updated user-specific profile feed including both the content item designated as eligible for presentation in the user-specific profile feed and content items associated with an additional posting user that are designated as eligible for presentation in the user-specific profile feed;

sending the updated user-specific profile feed to the viewing user, the updated user-specific profile feed including the content item of the one or more content items designated as eligible for presentation in the user-specific profile feed associated with the posting user and the content items associated with the additional posting user;

storing, without the second viewing user posting to the user-specific profile feed, a visitation state of the user-specific profile feed, the visitation state comprising information describing presentation of the user-specific profile feed to the viewing user and indicating a number of times that the updated user-specific profile feed was displayed to the second viewing user; and sending a notification including the visitation state to the posting user and the additional posting user, wherein the visitation state informs the posting user and the additional posting user that the second viewing user was presented with the user-specific profile feed and indicates the number of times that the updated user-specific profile feed was displayed to the second viewing user.

22. The method of claim 21, further comprising sending the visitation state of the user-specific profile feed to the posting user.

23. The method of claim 21, wherein the information describing presentation of the user-specific profile feed to the viewing user comprises one or more selected from a group consisting of: a name of the viewing user, a time the content item of the one or more content items was presented to the viewing user, a type of interaction with the content item of the one or more content items by the viewing user, and any combination thereof.

24. The method of claim 21, wherein the user-specific profile feed further comprises information identifying the posting user.

25. The method of claim 21, further comprising:

receiving an interaction of the viewing user with the user-specific profile feed;

updating the user-specific profile feed to include information describing the interaction; and presenting the user-specific profile feed updated to include the information describing the interaction.

* * * * *